United States Patent
Dinh et al.

(10) Patent No.: US 8,350,699 B2
(45) Date of Patent: Jan. 8, 2013

(54) METHOD AND SYSTEM FOR ADAPTIVE SLIDING DOOR PATTERN CANCELLATION IN METAL DETECTION

(75) Inventors: Erik Lee Dinh, Boca Raton, FL (US); Adam S. Bergman, Boca Raton, FL (US); Manuel A. Soto, Lake Worth, FL (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 0 days.

(21) Appl. No.: 13/353,417

(22) Filed: Jan. 19, 2012

(65) Prior Publication Data

US 2012/0112918 A1    May 10, 2012

Related U.S. Application Data

(63) Continuation-in-part of application No. 12/774,799, filed on May 6, 2010, now Pat. No. 8,264,353.

(51) Int. Cl.
*G08B 13/14* (2006.01)

(52) U.S. Cl. .................... 340/568.1; 455/63.1; 702/191

(58) Field of Classification Search .................. None
See application file for complete search history.

(56) References Cited

U.S. PATENT DOCUMENTS 5,617,513 A    4/1997    Schnitta

*Primary Examiner* — Brian Zimmerman
*Assistant Examiner* — Sara Samson
(74) *Attorney, Agent, or Firm* — Alan M. Weisberg; Christopher & Weisberg, P.A.

(57) ABSTRACT

A metal detection device, system and method are provided. The device includes a receiver that receives a signal pattern representing electromagnetic field disturbances over time caused by movement of metal doors in a detection region. The device further includes a memory in communication with the receiver. The memory stores a recorded signal pattern of a previously received signal pattern and at least one quality criterion. The device further includes a processor in communication with the memory. The processor determines pattern vitals indicating a quality of the received signal pattern. The processor further determines whether the at least one quality criterion is met based at least in part on the pattern vitals. The processor further updates the recorded signal pattern based at least in part on determining whether the at least one quality criterion is met.

20 Claims, 11 Drawing Sheets

METHOD AND SYSTEM FOR ADAPTIVE SLIDING DOOR PATTERN CANCELLATION IN METAL DETECTION

CROSS-REFERENCE TO RELATED APPLICATION

This application is a continuation-in-part-of patent application Ser. No. 12/774,799, filed May 6, 2010, entitled METHOD AND SYSTEM FOR SLIDING DOOR PATTERN CANCELLATION IN METAL DETECTION, the entirety of which is incorporated herein by reference.

STATEMENT REGARDING FEDERALLY SPONSORED RESEARCH OR DEVELOPMENT n/a

FIELD OF THE INVENTION

The present invention relates generally to metal detection systems and more specifically to a method and system for reducing the signal interference effects of metal doors upon the metal detection capabilities of the metal detection system

BACKGROUND OF THE INVENTION

Metal detection systems are useful in detecting the unauthorized removal of metal items from a protected area as well as detecting metal objects that may be brought into a protected area. Particularly in retail environments, metal detection systems save stores hundreds of thousands of dollars by preventing the unauthorized removal of unpaid-for items from the store. In places such as schools, airports, and stadiums, metal detectors serve the purpose of preventing patrons from bringing in weapons or items that could cause harm to others or leaving with items that they have not purchased.

Metal detection systems are often combined with electronic article surveillance ("EAS") systems. EAS systems are commonly used in retail stores and other settings to prevent the unauthorized removal of goods from a protected area. Typically, such a system is configured at an exit from the protected area. The system includes one or more transmitters, receivers and antennas, stored in a housing (such as an EAS pedestal) capable of generating an electromagnetic field across the exit, known as the "interrogation zone" or "detection region". Articles to be protected are tagged with an EAS marker that, when active, generates a response signal when passed through this interrogation zone. An antenna and receiver in the same or another "pedestal" detects this response signal and generates an alarm and/or sends an alert message to monitoring personnel. Combination EAS/metal detection systems utilize the pedestals to detect both the unauthorized removal of goods as well as metal objects entering or exiting the interrogation zone.

One reason for combining metal detection functions in an EAS system is due to the problems EAS systems experience relating to their inability to detect unauthorized removal of tagged items when the tags are placed in a shielded environment, such as when EAS tags are contained in a metal-lined bag. Often, unscrupulous shoppers bring metal-lined bags to a store with the idea of placing an item having an EAS tag in the bag, and attempt to walk out of the store undetected. EAS detection systems that do not include metal detection capability may be defeated by utilizing this method. Therefore, in order to prevent this from occurring, EAS systems employ metal detection capabilities. With the emergence of metal detection integrated with EAS technology, EAS systems have become more and more robust and seamless in offering customers a complete solution to their loss prevention needs. The new "combination" system utilizes the existing EAS pedestals, thus maximizes efficiency in terms of cost, space and overall aesthetics of the system.

However, metal detection systems, whether they are stand-alone systems, or combination EAS/metal detection systems are not without their inherent problems. A problem that arises is when a metal detection or combination EAS/metal detection system systems has been installed in close proximity with some type large metal object, such as a metal door frame. Metal doors, such as, for example, sliding metal doors, are common in many retail store environments. These sliding metal doors tend to degrade the performance of metal detection. This is because when installed nearby a metal door frame, the electromagnetic field gradient, which is the essence of metal detection, is compromised as the door is in motion, leading to false alarms. Also, the amount of metal in the door as compared with the amount of metal present in a transitory metallic object such as a tag shield, e.g., foil-lined bag, results in a metal detection response signal from the door that is many orders of magnitude stronger than the response from the transitory metallic object such as the metal tag shield. While these metal doors have no effect on EAS detection, the interference with the metal detection capabilities of the system caused by the opening and closing of these doors and the amount of metal in the door can be quite severe.

Other attempts to lessen or eliminate the effects of metal doors in a metal detection zone have proven to be in adequate. Some of these include shielding and electrically separating the door and the pedestals, recommending a "safe" distance; and developing an entirely new stand-alone metal detection system that works independently from the EAS system. Since a sliding metal door has profound effects on the metal detection system, shielding the door from the antennas is not a practical option. The metal detection portion of combination EAS/metal detection systems are extremely sensitive to any changes in field gradient and therefore no reasonable amount of metal shield is adequate to prevent change in field gradient when the metal sliding doors are in motion. Placing the system at a "safe" distance, or utilizing non-EAS independent metal detection systems are not efficient as the methods defeat the purpose of integrating metal detection into EAS systems, which are more often than not installed in close proximity with sliding metal doors.

Moreover, metal detection systems typically lose metal detection accuracy over time due to drift or changes over time. Drift may be caused by numerous factors such as component movement and metal detection zone changes. For example, a signal received by the metal detection system may vary over time or drift even though the metal objects the system was designed to detect are not present, e.g., signal amplitude increases over time even though the metal objects are not present. The drift, e.g., increase in signal amplitude, may cause false metal detection alarms in which the number of false alarms may continually increase as drift becomes worse such that the system may end up constantly triggering false alarms. In order to fix the false alarm problem, metal detection system users such as retail stores may end up having to install a new metal detection system or may need a technician to manually recalibrate the system. Such actions to fix the false alarm problem may incur substantial cost and may even deter retail stores from fixing the problem, i.e., may simply turn off the metal detection system, leaving the store vulnerable to theft.

Therefore, what is needed is a system and method for nullifying the effects of moving metal doors in a metal detection interrogation zone taking into account environmental factors such as pattern drift.

SUMMARY OF THE INVENTION

The present invention advantageously provides a method and system for reducing the signal interference effects of metal doors in a metal detection system. The system includes a transmitter operable to transmit an interrogation signal that is used to detect transitory metal objects within the detection region, a receiver operable to receive instantaneous signals that represent electromagnetic field disturbances during operation of the metal detection system and include electromagnetic field disturbances attributed to the movement of metal doors. The system also includes a metal detection module that determines a resulting waveform representing the difference between the instantaneous signals received during operation of the metal detection system and a recorded pattern of signals representing electromagnetic field disturbances caused by a pattern of movement of the metal doors in the detection region when a transitory metallic object is not present. The record pattern is canceled from the resulting waveform leaving only signals from transitory metal objects detected in the metal detection region without the interference of signals from the metal doors.

In one aspect of the invention, a method of reducing the signal interference effects of metal doors in a metal detection system is provided. The method includes recording a pattern of signals representing electromagnetic field disturbances over time caused by a pattern of movement of the metal doors in a detection region when a transitory metallic object is not present. The method also includes receiving instantaneous signals representing electromagnetic field disturbances during operation of the metal detection system. The instantaneous signals include electromagnetic field disturbances attributed to the movement of the metal doors, where the movement of the metal doors during operation of the metal detection system is substantially the same as the pattern of movement of the metal doors during the recording of the pattern of signals. The method also includes determining a resulting waveform, where the resulting waveform represents a difference between the instantaneous signals received during operation of the metal detection system and the recorded pattern of signals.

In another aspect, a metal detection system is provided. The metal detection system includes a transmitter operable to transmit an interrogation signal, where the interrogation signal establishes a detection region and being used to detect transitory metal objects within the detection region, a receiver operable to receive instantaneous signals in response to the interrogation signal, where the instantaneous signals represent electromagnetic field disturbances during operation of the metal detection system, the instantaneous signals including electromagnetic field disturbances attributed to the movement of metal doors, and a metal detection module. The metal detection module determines a resulting waveform, where the resulting waveform represents a difference between the instantaneous signals received during operation of the metal detection system and a recorded pattern of signals representing electromagnetic field disturbances over time caused by a pattern of movement of the metal doors in the detection region when a transitory metallic object is not present. The movement of the metal doors during operation of the metal detection system is substantially the same as the pattern of movement of the metal doors during the recording of the pattern of signals. The metal detection module is operable to determine if a metal object is present in the detection region based on the resulting waveform.

In accordance with yet another aspect, an integrated EAS/metal detection system is provided. The integrated EAS/metal detection system includes a transmitter operable to transmit an interrogation signal, the interrogation signal establishing an interrogation zone and being used to detect EAS markers and transitory metal objects within the interrogation zone, and a receiver operable to receive instantaneous signals in response to the interrogation signal. The instantaneous signals represent electromagnetic field disturbances during operation of the metal detection system, the instantaneous signals including electromagnetic field disturbances attributed to the movement of metal doors. The system further includes a metal detection module operable to determining a resulting waveform, the resulting waveform representing a difference between the instantaneous signals received during operation of the metal detection system and a recorded pattern of signals representing electromagnetic field disturbances over time caused by a pattern of movement of the metal doors in the detection region when a transitory metallic object is not present. The movement of the metal doors during operation of the metal detection system is substantially the same as the pattern of movement of the metal doors during the recording of the pattern of signals. The metal detection module is operable to determine if a metal object is present in the detection region based on the resulting waveform.

In accordance with yet another aspect, an electronic article surveillance (EAS)/metal detection device is provided. The device includes a receiver that receives a signal pattern representing electromagnetic field disturbances over time caused by movement of metal doors in a detection region. The device further includes a memory in communication with the receiver. The memory stores a recorded signal pattern of a previously received signal pattern and at least one quality criterion. The device further includes a processor in communication with the memory. The processor determines pattern vitals indicating a quality of the received signal pattern. The processor further determines whether the at least one quality criterion is met based at least in part on the pattern vitals. The processor further updates the recorded signal pattern based at least in part on determining whether the at least one quality criterion is met.

In accordance with yet another aspect, an integrated electronic article surveillance (EAS)/metal detection system is provided. The system includes at least one sensor in which the at least one sensor detects a position of metals doors in a detection region. The device includes a receiver in communication with the at least one sensor. The receiver receives positional data of metal doors and a signal pattern representing electromagnetic field disturbances over time caused by movement of the metal doors in the detection region. The device further includes a memory in communication with the receiver. The memory stores a recorded signal pattern of a previously received signal pattern and at least one quality criterion. The device further includes a processor in communication with the memory. The processor determines whether the metal doors are opening based at least in part on the positional data. The processor further determines pattern vitals in response to determining the metal doors are opening. The pattern vitals indicate a quality of the received signal pattern. The processor further determines whether the at least one quality criteria are met based at least in part on the pattern vitals. The processor further updates the recorded signal pattern in response to determining the at least one quality criterion is met.

In accordance with yet another aspect, a method of reducing signal interference effects of metal doors in a metal detection system is provided. A signal pattern representing electromagnetic field disturbances over time caused by movement of metal doors in a detection region is received. A recorded signal pattern of a previously received signal pattern and at least one quality criterion is stored. Pattern vitals are determined. The pattern vitals indicate a quality of the received signal pattern. A determination is made whether the at least one quality criterion is met based at least in part on the pattern vitals. The recorded signal pattern is updated in response to determining the at least one quality criterion is met.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 1:
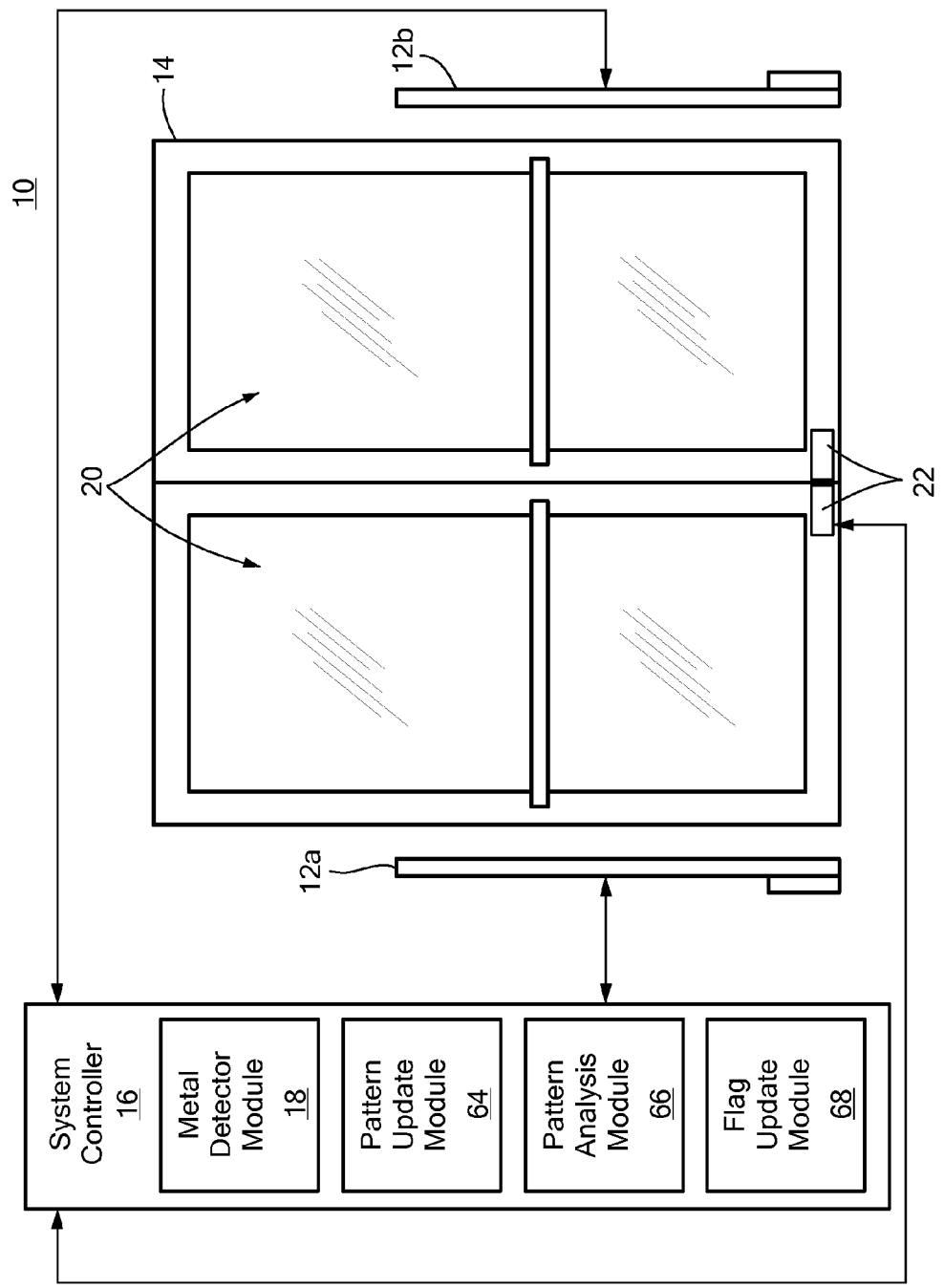
FIG. 1 is a diagram of an exemplary integrated electronic article surveillance ("EAS")/metal detection system with closed metal doors constructed in accordance with the principles of the present invention.

Before describing in detail exemplary embodiments that are in accordance with the present invention, it is noted that the embodiments reside primarily in combinations of apparatus components and processing steps related to implementing a system and method for reducing false alarms in metal detection or integrated EAS/metal detection systems caused by field disturbances attributed to the opening and closing of metal doors within or proximate the metal detection interrogation zone. Accordingly, the system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

One embodiment of the present invention advantageously provides a method and system for reducing false alarms that occur in metal detection systems due to field disturbances caused by the opening and closing of sliding metal doors proximate the metal detection interrogation zone. The movement of sliding metal doors introduces extraneous signals within the electromagnetic ("EM") field that may mask the detection of actual metal objects being brought into or out of a metal detection zone. The present invention measures the signals produced by the movement of the metal doors without the presence of other metal objects, records these signals, and filters them out of the total instantaneous detected EM energy received during actual metal detection in order to more accurately determine if a metal object has been detected without the potential interference from signal disturbances caused by the movement of the metal doors.

Referring now to the drawing figures in which like reference designators refer to like elements, there is shown in FIG. 1 an exemplary configuration of an integrated EAS/metal detection system 10 constructed in accordance with the principles of the present invention and located, for example, at a retail facility entrance. It should be noted that the present invention is equally adaptable to stand-alone metal detection systems as with integrated EAS/metal detection systems. Thus, the terms "EAS/metal detection system", "metal detection system" and "detection system" are used interchangeably throughout this specification and the exclusion of one or the other shall not limit the invention in any way.

EAS detection system 10 includes a pair of pedestals 12a, 12b (collectively referred to herein as "pedestals 12") on opposite sides of a door entrance 14. One or more antennas for the detection system 10 may be included in pedestals 12a and 12b, which are located a known distance apart. The antennas located in the pedestals 12 are electrically coupled to a system controller 16 which controls the operation of the detection system 10. Within system controller 16 is a metal detection module 18, pattern update module 64, pattern analysis module 66 and flag update module 68. The metal detection module 18 detects the presence of metal objects within a metal detection region. Metal detection module 18 detects the presence of metal objects entering or leaving an interrogation zone established by the antennas within pedestals 12. Pattern update module 64 may determine whether to update recorded pattern 44 as discussed in detail with respect to FIGS. 8-9. Pattern analysis module 66 may determine pattern vitals or characteristic as discussed in detail with respect to FIG. 10. Flag update module 68 may determine whether one or more update flags are updated as discussed in detail with respect to FIG. 11. Metal detection module 18 may be implemented in hardware and/or as software operating on a microprocessor. Metal detection module 18, pattern update module 64, pattern analysis module 66 and flag update module 68 may also be a software module stored within the memory of, for example, a system controller of a combination EAS/metal detection system which is executed by a microprocessor. Alternately, metal detection module 18, pattern update module 64, pattern analysis module 66 and flag update module 68 can, themselves, have a controller or other processing unit that performs the metal detection functions.

Metal detection module 18 operates to detect the presence of metal objects within a given metal detection zone. Metal detection module 18 includes a transmitting antenna that transmits metal detection interrogation signals at a specified frequency such as, for example, 56 kHz. The transmitter may be located on, within, or near the pedestal 12 at the entrance of the store, and transmits an electromagnetic signal within a specified interrogation zone. The interrogation zone could be, for example, a floor of a store where metal objects may be brought into or removed from the zone. The transmitter also includes the necessary hardware and software to generate the signal. Metal detection module 18 also includes an antenna, "listens" for signals received from metal objects and forwards these signals to metal detection module 18. In one embodiment, if the received signal is above a given threshold, then the metal detection alarm will sound.

One method for detecting metal is based on detecting an induced eddy current during an electromagnetic ("EM") excitation. The induced eddy current dissipates very quickly, on the order of tens of microseconds in the case of a good conductor. The dissipation is worse with a poor conductor. Even with a good conductor, eddy current dissipation is about two orders of magnitude shorter than that of the acoustic marker.

Entrance 14 includes one or more sliding metal doors 20, which open or close when patrons approach the doors 20. Located on or proximate doors 20 is one or more door sensors 22, which detect movement, i.e., opening or closing of the doors 20 such as when a patron approaches doors 20 in order to enter or leave the store. Sensors 22 are in operable communication with system controller 16 and, more particularly, metal detection module 18, and send signals to system controller 16 and/or detection module 18 indicating if the doors 20 are open or closed, and if open, to what extent they are open. Sensors 22 can be one or more sensors depending on the complexities related to the metal doors 20 and their design. The invention is not limited to a specific number or placement of sensors 22. It is also noted that the term "sensor" as used herein refers to any device that can detect the position of doors 20. In other words, it is contemplated that a sensor as used in accordance with the present invention can be a contact switch, magnetic switch, voltage translator, etc.

Figure 2:
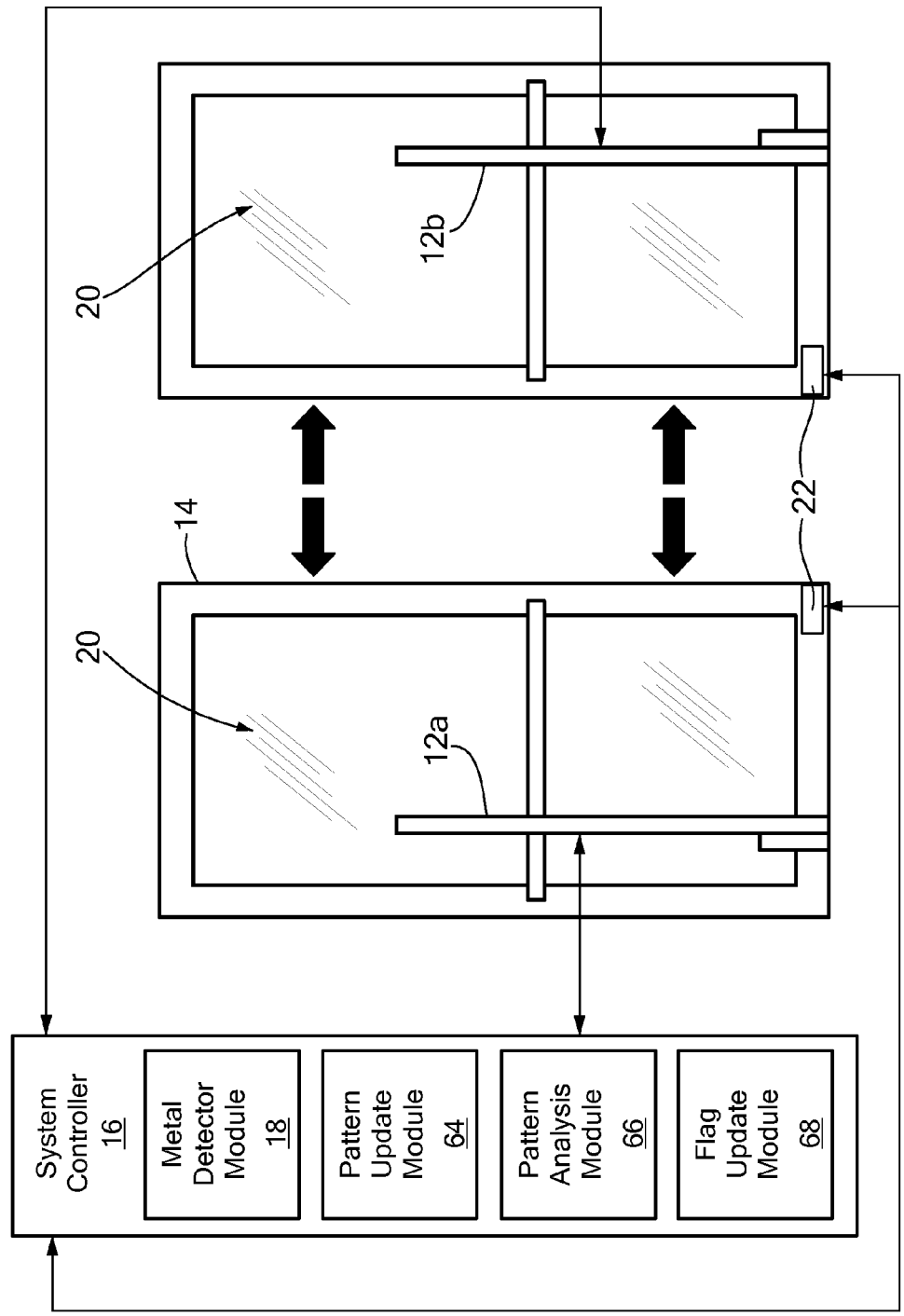
FIG. 2 is a diagram of the integrated EAS/metal detection system of FIG. 1 showing the sliding metal doors in an open configuration.

As shown in FIG. 1, doors 20 are in a closed configuration, indicating that no patrons have approached doors 20. FIG. 2 shows doors 20 in an open orientation. Thus, one or more patrons have approached doors 20, which, as is well known in the art, are designed to sense the approach of a person and open automatically. Door sensors 22 detect not only that doors 20 have opened but also detects to what extent they are open, i.e., the relative position doors 20 are in when compared to a fully closed position, as in FIG. 1. Information regarding the positional status of doors 20 is transmitted to system controller 16 and/or metal detection module 18 either via a wired or wireless connection.

Figure 3:
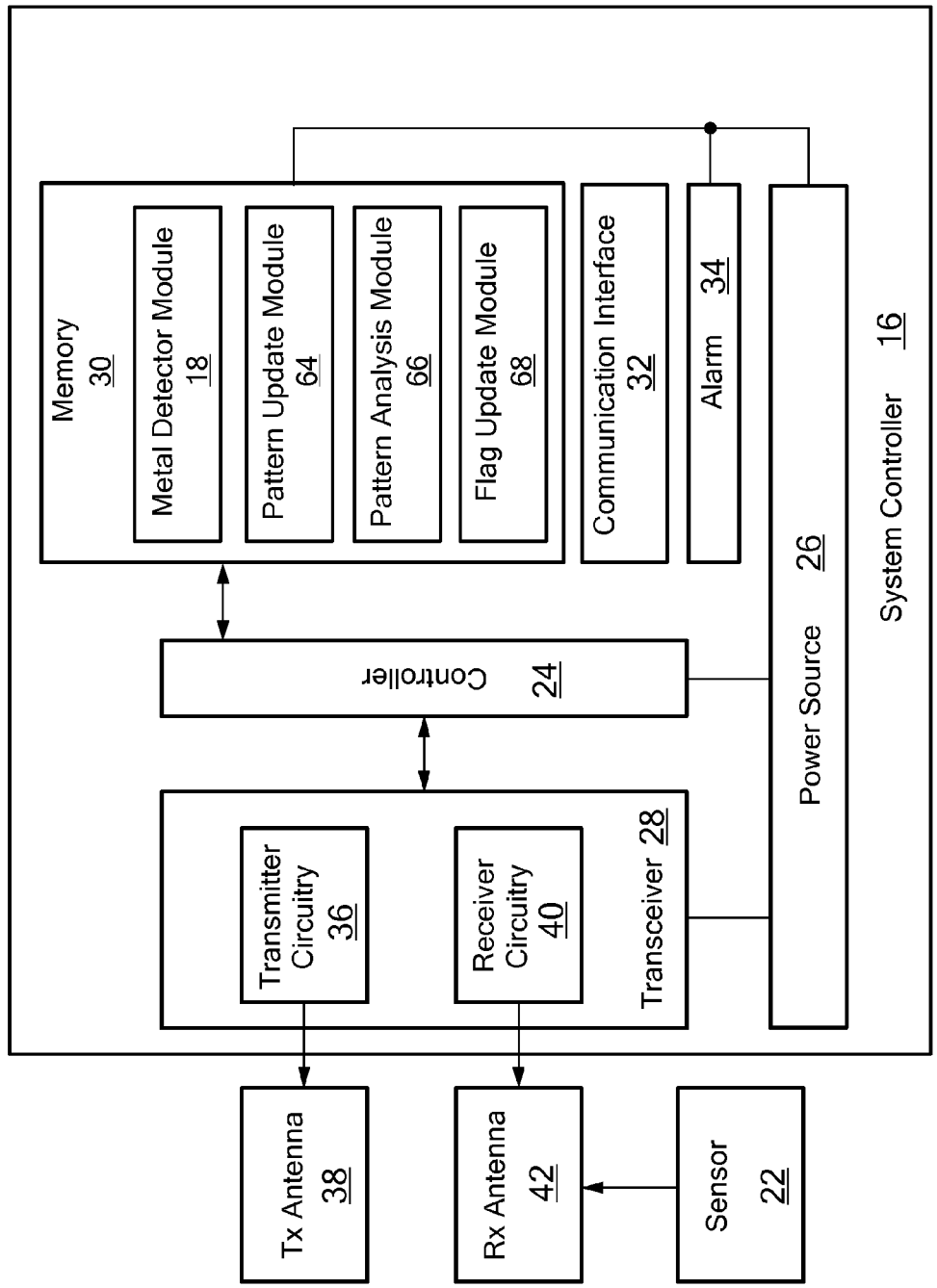
FIG. 3 is a block diagram of an exemplary integrated EAS/metal detection system constructed in accordance with the principles of the present invention.

As mentioned above, the present invention is adaptable to be used not only in a stand-alone metal detection system but also in a combination EAS/Metal Detection system. Referring now to FIG. 3, an exemplary integrated EAS/Metal Detection system that may include a controller 24 (e.g., a processor or microprocessor), a power source 26, a transceiver 28, a memory 30 (which may include non-volatile memory, volatile memory, or a combination thereof), a communication interface 32 and an alarm 34. The controller 24 controls radio communications, storage of data to memory 30, communication of stored data to other devices, and activation of the alarm 34. The power source 26, such as a battery or AC power, supplies electricity to the EAS system controller 16. The alarm 34 may include software and hardware for providing a visual and/or audible alert in response to detecting an EAS marker and/or metal within an interrogation zone of the EAS/Metal Detection system 10.

The transceiver 28 may include a transmitter 36 electrically coupled to one or more transmitting antennas 38 and a receiver 40 electrically coupled to one or more receiving antennas 42. Alternately, a single antenna or pair of antennas may be used as both the transmitting antenna 38 and the receiving antenna 42. The transmitter 36 transmits a radio frequency signal using the transmit antenna 38 to "energize" an EAS marker within the interrogation zone of the EAS/Metal Detection system 10. The receiver 40 detects the response signal of the EAS marker using the receive antenna 42.

In one embodiment, metal detection module 18 is a software module stored within memory 30. However, metal detection module 18 may also be implemented by using discrete components or may be a combination of hardware and software elements. For example, in addition to or instead of controller 24, metal detection module 18 can, itself, have a controller or other processing unit that performs the filtering and metal detection functions described here.

Sensors 22 transmit signals to antenna 42 indicating the relative position of doors 20. These signals indicate the exact position of doors 20 within entrance 14. Antenna 42 sends this information to system controller 16. The position information is also sent to metal detection module 18. The opening and closing of metal doors 20 exhibit a recognizable pattern of interference with regard to the electromagnetic ("EM") field. Advantageously, the present invention utilizes this information by recording these patterns and using them as a reference. For example, without operating the metal detection system for the purpose of metal detection, i.e., for the purpose of calibration without the presence of a transitory metallic object in the interrogation zone established by pedestals 12, metal detection interrogation signals can be recorded that relate to the amount of electromagnetic field gradient disturbance caused by doors 20 and they move from a fully closed position and gradually open toward a fully open position. The metal detection system can record the effects of metal doors 20 on the EM field without any metal objects in the metal detection zone to determine the disturbances due solely to the presence and movement of metal doors 20. Signal strength measurements are periodically made as doors 20 move to their fully open position. The sampling rate of the measurements can be based on the processing speed and storage memory of system controller 16. The signal strength measurements form a pattern. The signal strength measurements forming the pattern are then recorded and used as a reference for pattern recognition and cancellation, resulting in a nullified metal detection signal free of effects from the moving door. Thus, instead of metal detection module 18 only receiving signals from antenna 42 and processing these signals to determine if metal objects are present, metal detection module 18 now also receives metal door position information obtained by sensor 22.

As is described below, metal detection module 18 compares a series of instantaneous signals received from antenna 42, where these signals indicate the electromagnetic field disturbances received during the metal detection phase. The signals include responses from interrogated metal objects as well as signals attributed to the movement of the metal doors 20. Metal detection module 18 compares these received signals with the pre-recorded pattern of signals related exclusively to the EM disturbances caused by the movement of the metal doors 20 in order to provide a resulting nullified signal indicating the presence of metal objects in the metal detection region without the interfering effects from metal doors 20.

Figure 4:
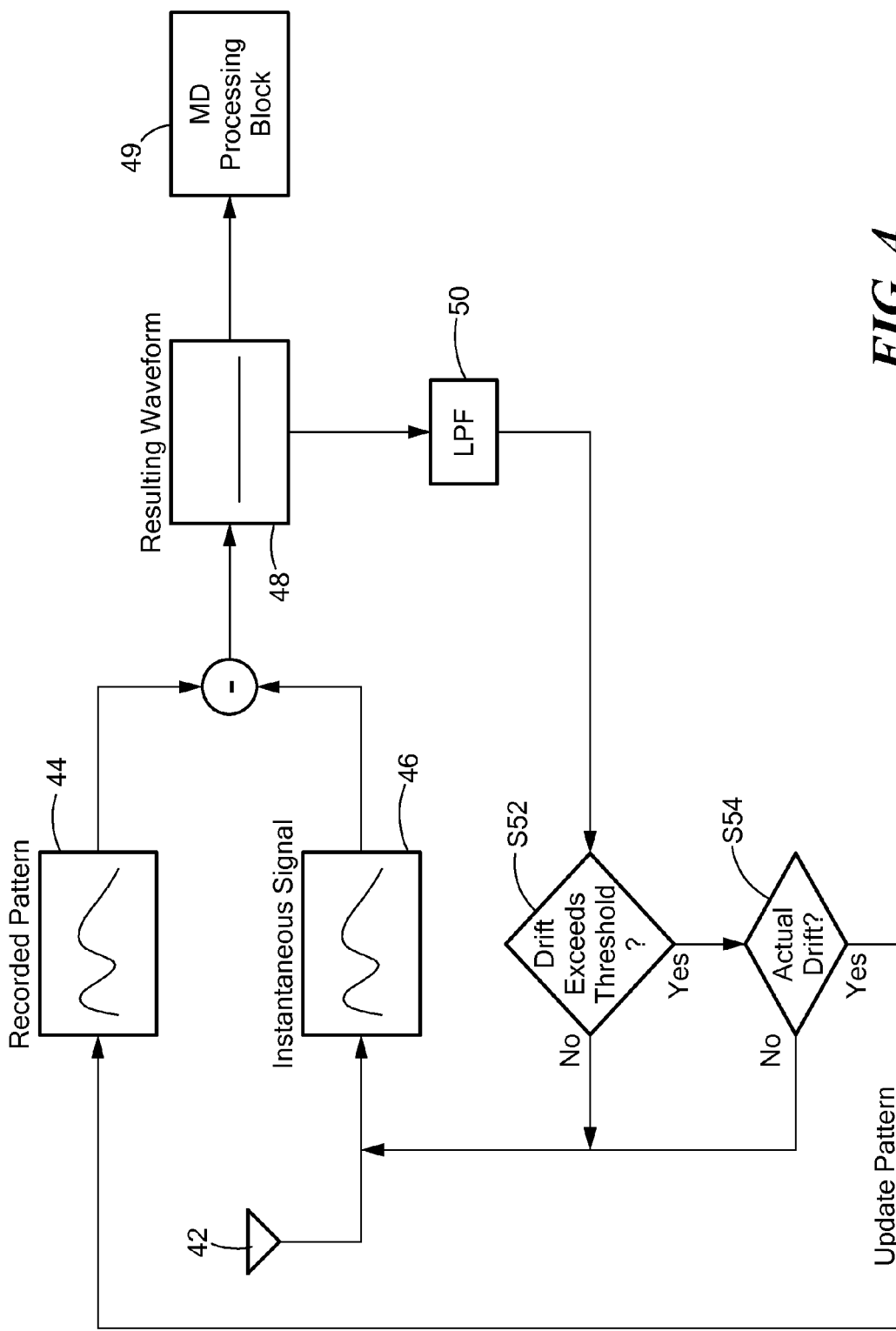
FIG. 4 is a block diagram illustrating an exemplary process by which the present invention detects and cancels extraneous disturbances caused by the opening of metal doors within the metal detection zone when there are no metal objects in the metal detection zone.

FIG. 4 is a block diagram illustrating an exemplary process by which the present invention detects and records patterns of interference caused by the opening of doors 20 upon the metal detection capabilities of the system 10 and how the interference caused by the doors 20 can be filtered out and eliminated, thus allowing metal detection to occur without the extraneous metal door signal interference. In FIG. 4, a pattern 44 representing signals related to EM disturbances caused by the movement of metal doors 20 is initially sampled and recorded in order to establish a base reference pattern. Thus, for example, measurements are taken as metal doors 20 are opened. These measurements track the EM field disturbances caused by the opening and closing of the doors 20 over time without the operation of metal detection module 18 and without any other transitory metallic objects, e.g., foil-lined bags, present. Thus, the recorded waveform represents EM disturbances caused solely by doors 20 without any metal detection taking place. In one embodiment, the samples of the opening of doors 20 are taken and recorded over and over until a consistent pattern is detected.

When the metal detection portion of system 10 is in operation, antenna 42 is receiving signals that indicate the presence or absence of metal objects within the metal detection region. These instantaneous signals include interference signals caused by the opening of metal doors 20 as well as any transitory metallic objects and provide an instantaneous signal over time, resulting in waveform 46. Because of the influence of metal doors 20, the signal 46 detected may mask the actual small signals received from transitory metal objects. However, because waveform 44 represents the disturbances caused solely by the opening and closing of doors 20, these signals are subtracted, or cancelled, resulting in a nullified signal, represented by waveform 48. FIG. 4 depicts the scenario where there are no metal objects detected in the detection region. In other words, the recorded waveform 44 caused by disturbance patterns created by the opening of doors 20 without metal detection and the instantaneous waveform 46 detected during metal detection operation are virtually identical, since there are no transitory metal objects in the detection region and the signals detected are all due to metal doors 20. Thus, resulting waveform 48 shows a substantially flat line, indicating no disturbances over time, as waveform 46 and waveform 44 have canceled each other out.

It should be noted that although waveform 48 is represented by a substantially horizontal line in FIG. 4, such a line does not imply that the result of subtracting recorded pattern 44 from instantaneous signal 46 (of vice verse) should be zero. It is contemplated that that the substantially horizontal line can be offset from the zero point of the "y-axis". The resulting nullified signal 48 is then processed by metal detector processing block 49, free of metal door influences and disturbances, to determine if there are metal objects passing through system 10. In the case of the example shown in FIG. 4, metal detector processing block 49 determines from waveform 48 that no transitory metal objects are present in the metal detection region.

The signal represented by resulting waveform 48 corresponds to the scenario where there are no transitory metal objects in the metal detection zone. This signal is passed through a low pass filter ("LPF") 50 to filter out any extraneous signals that might indicate that metal is in the region. Because the recorded waveform 44 may change over time due to environmental changes, the present invention includes an arrangement that updates waveform 44 accordingly to account for these changes. The change that may occur over time is referred to as "drift". This drift warrants an update of recorded pattern 44 when the drift falls within a certain predetermined range or has exceeded a predetermined threshold. Low pass filter 50 is used to ensure this drift is "real" and satisfies two criteria: gradual drift and permanent drift.

The filtered signal is examined to determine if the actual signal drift has exceeded a threshold amount (step S52). If the drift has exceeded the predetermined threshold amount, it is then be determined if the drift is real and not due to other factors such as outliers or "spikes" in the system (step S54). Steps S52 and S54 can be performed by hardware, software or a combination of both within, for example, system controller 16. If actual drift has occurred, the system controller 16 updates the stored pattern 44 such as by using the latest instantaneous pattern, i.e., the waveform that results after filter 50 has processed waveform 48 or by prompting management personnel to institute a recalibration process by which recorded pattern 44 is knowingly obtained without the presence of transitory metal in the system. Thus, when excess drift has occurred, system 10 advantageously updates stored recorded pattern 44. This provides a more accurate benchmark for future metal object detection using the present invention. If it is determined that the drift is not actual drift but due to extraneous outliers, or if the drift has not exceeded the predetermined threshold, recorded pattern 44 is not updated and the current recorded pattern 44 continues to be used. Therefore, system 10 includes a module for determining whether any drift has occurred. This module, which may include filter 50, may include any combination of hardware and software necessary to determine whether this drift is actual drift and not caused by outliers, and whether the recorded pattern of signals caused by the movement of metal doors 20 needs to be updated.

Figure 5:
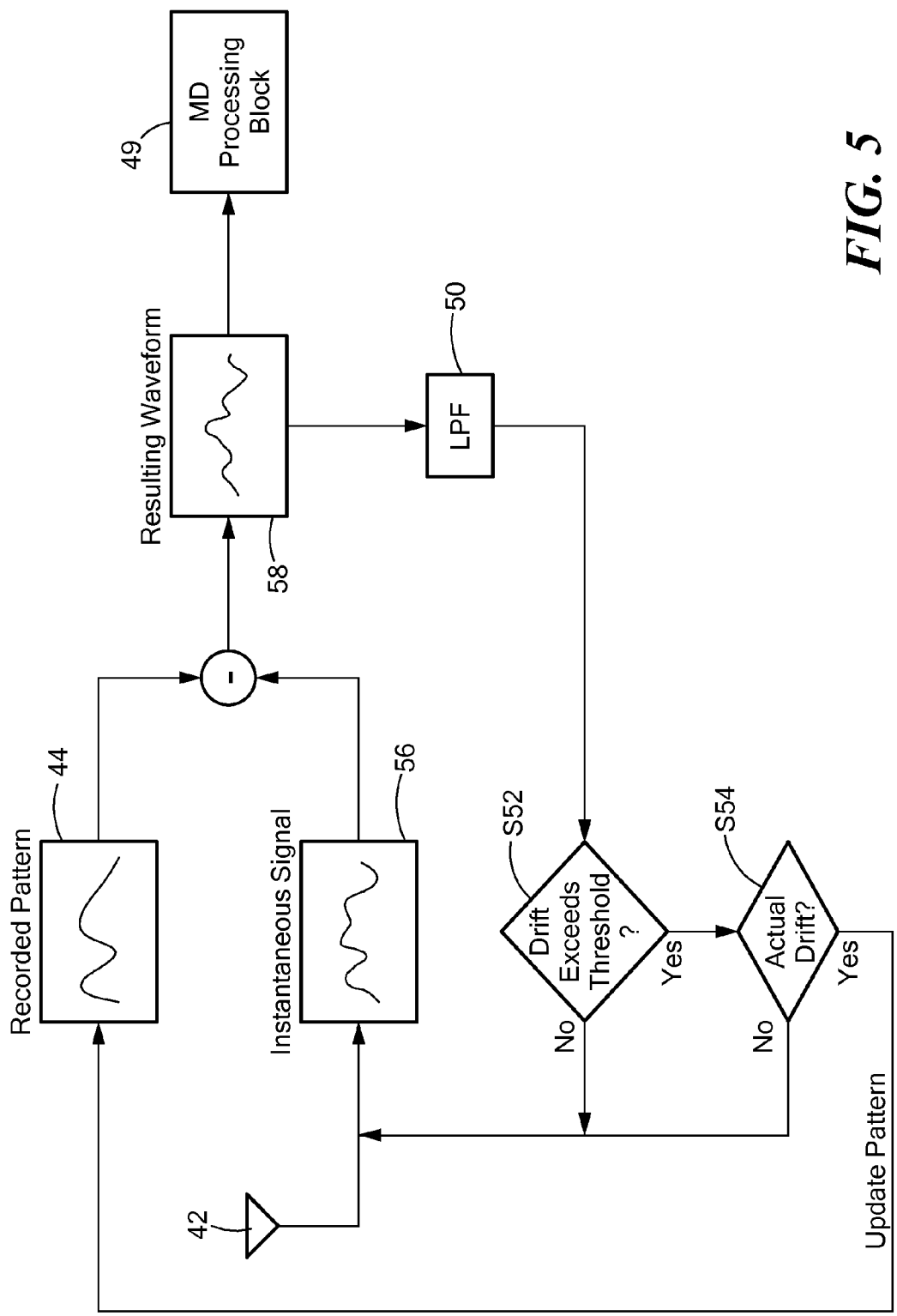
FIG. 5 is a block diagram illustrating an exemplary process by which the present invention filters out extraneous disturbances caused by the opening of metal doors to detect metal objects in the metal detection zone when there are metal objects present in the metal detection zone.

FIG. 5 is a diagram showing an arrangement in which transitory metal objects are present in the metal detection zone. In this embodiment, waveform 44 representing EM disturbances due to the movement of metal doors 20 is subtracted from the waveform of instantaneous signal 56, which represents the instantaneous signal received from antenna 42, as in FIG. 4. However, now, the resulting waveform 58 that is sent to metal detector processing block 49 represents the presence of transitory metal objects in the metal detection zone, since the nullified signal represented by waveform 58 is no longer flat, as in FIG. 4. Thus, resulting waveform 58 represents the difference between actual instantaneous signal 56, which includes the disturbances patterns caused by the movement of doors 20, and recorded waveform 44 which is based solely on doors 20. The resulting waveform 58 is processed by metal detector processing block 49 which, in the case of the embodiment of FIG. 4, determines the presence of metal objects in the detection zone. Advantageously, the resulting signal 58 is not degraded by the influence of metal doors 20, since the disturbance pattern due to doors 20 is known, and removed from the instantaneous signal 56. As in FIG. 4, filter 50, which may be a low pass filter, along with the functions performed at steps S52 and S54, determine if any perceived drift exceeds a predetermined threshold and whether the drift is "actual" drift and not caused by any outliers. If the perceived drift is determined to be actual drift, then the originally-recorded disturbance pattern 44 is replaced by the current resulting waveform 58 and used for subsequent metal detection analyses. In one embodiment, low pass filter 50 is a slow filter that has a large number of taps, e.g., 500-1000 taps, to thereby eliminate short term changes, i.e., impulses, from triggering the drift threshold re-recording process.

Figure 6:
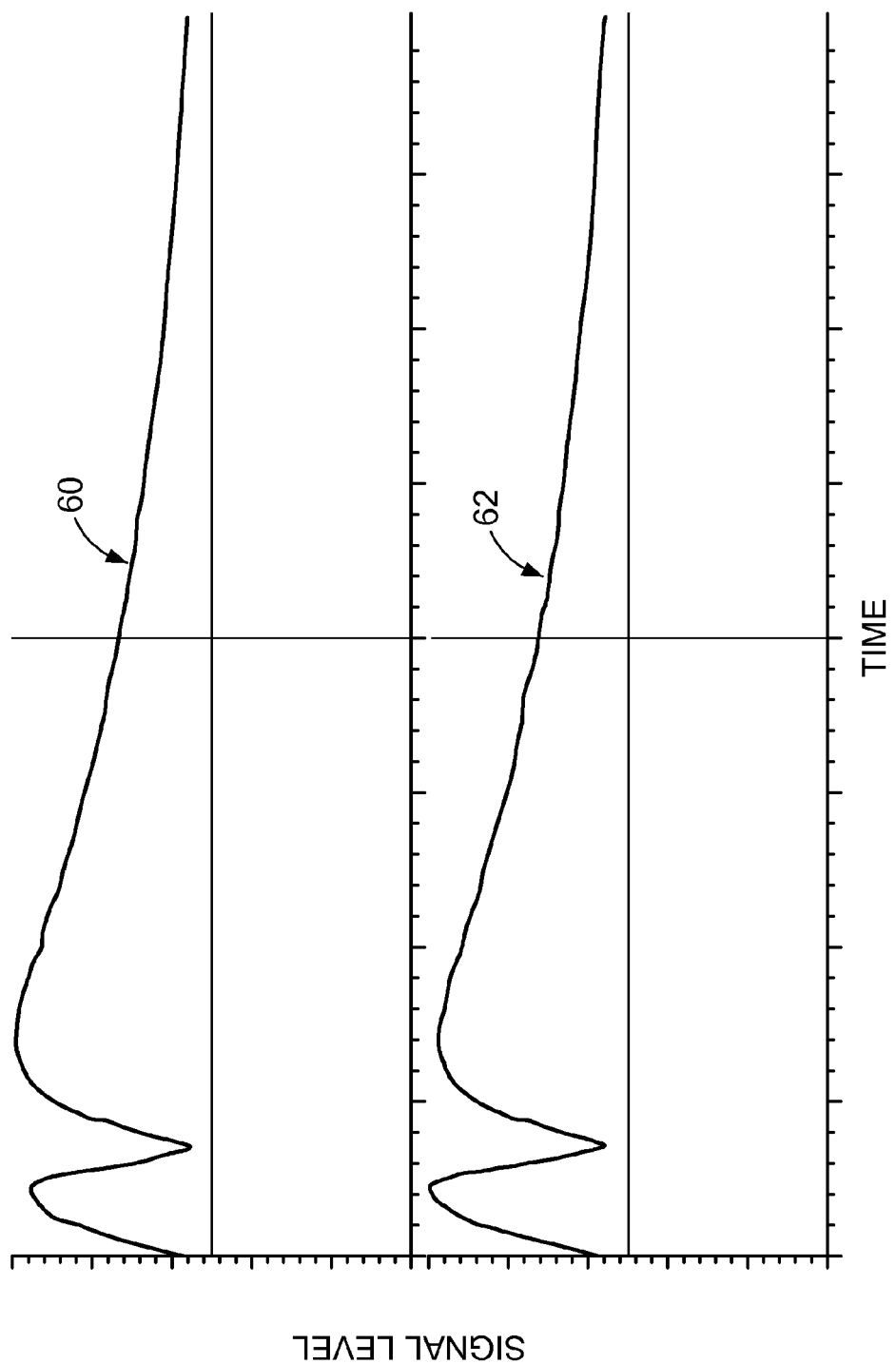
FIG. 6 is a comparison between a recorded waveform representing interference caused by a sliding metal door and an instantaneous waveform representing field disturbance detected by the metal detection system of the present invention.

FIG. 6 illustrates a comparison of an exemplary recorded pattern 60 representing metal door EM field disturbances and an exemplary instantaneous signal 62 representing instantaneous field disturbances measured by a metal detection system utilizing the present invention. Each waveform measures the level of disturbance (vertical axis) vs. time (horizontal axis), where metal doors 20 begin in a fully closed position and gradually separate, getting further and further apart, until fully opened. The top waveform, i.e., recorded pattern 60 in FIG. 6 represents the recorded waveform of disturbance signals produced by doors 20 moving from a fully closed position to a fully open position. This waveform 60 represents disturbance signals due to doors 20 only, and not due to any other metal objects. The waveform shown as instantaneous signal 62 represents the measured instantaneous metal detection signal received by antenna 42, and includes both disturbance signals from doors 20 as well as any other signals detected by antenna 42 in response to a metal detection interrogation signal.

In the example shown in FIG. 6, there is very little difference between the recorded pattern 60 and the actual instantaneous signal 62, thus indicating that no transitory metal objects are present in the metal detection zone, as shown in the scenario in FIG. 4. In this scenario, the resulting nullified waveform would be a substantially horizontal line such as the nullified resulting waveform 48 in FIG. 4, or another visual image indicating that waveform 60 and waveform 62 are virtually identical, due to the fact that no other transitory metal objects are contributing to EM field disturbances other than movement of metal doors 20. However, if metal objects were in the metal detection zone, the resulting waveform would be recognizably different from nullified resulting waveform 48, perhaps showing "peaks" and/or "valleys". Depending upon the scale of the axes, these variations could appear larger or smaller in waveform 58. These variations would indicate the actual presence of transitory metal objects in the detection zone and the difference between the waveform for instantaneous signal 62 and the waveform for the recorded pattern 60 would be a pattern other than the substantially horizontal line as when there were no metal objects detected. Advantageously, once the waveform attributed to the movement of metal doors 20 is cancelled from the composite waveform, the remaining waveform can be processed by metal detection processing block 49 where it is determined if metal objects are in the metal detection region, without the interference of metal doors 20.

Of note, although the present invention is discussed and described using examples where doors 20 start from a fully closed position to a completely open position, the present invention is not limited to such. It is contemplated that a series of different patterns can be recorded where doors 20 commence opening prior to being fully closed. Such a situation might occur, for example, where a patron triggers door opening prior to complete closure. By recording the series of patterns, the instantaneous signal can be compared with the recorded pattern corresponding to the closure state of doors 20 when the opening is triggered. For example, a pattern can be recorded where door opening is triggered when doors 20 are only closed 50%. If it is determined that that the instantaneous signal is based on the 50% closure pattern, the recorded pattern corresponding to the 50% closure is used for comparison.

The present invention advantageously accounts for EM signal disturbances that are attributed to the opening and closing of metal doors 20 within a metal detection zone that would otherwise mask the detection of actual objects in the metal detection zone. By pre-recording the effects of doors 20 over time, a waveform 44 is created. This waveform 44 is subtracted from the actual, detected instantaneous signal received from antenna 42 due to the interrogation response signals received from objects within the metal detection zone. The resulting waveform is analyzed to determine if transitory metal objects are actually present in the metal detection region, where the resulting waveform no longer includes the effects of metal doors 20. It is noted that the present invention is adaptable both to metal detection systems as well as integrated EAS/metal detection systems. Thus, metal foil detection can be accomplished in systems that are already utilizing EAS technology to prevent the unauthorized removal of goods from a protected area. The method and system of the present invention enhances EAS capability by reducing the effects that sliding metal doors have on metal detection capability to more efficiently and accurately detect when metal objects, such as metal foil bags, are brought into the detection region, for the purpose of removing objects from the EAS and metal detection zone.

Figure 7:
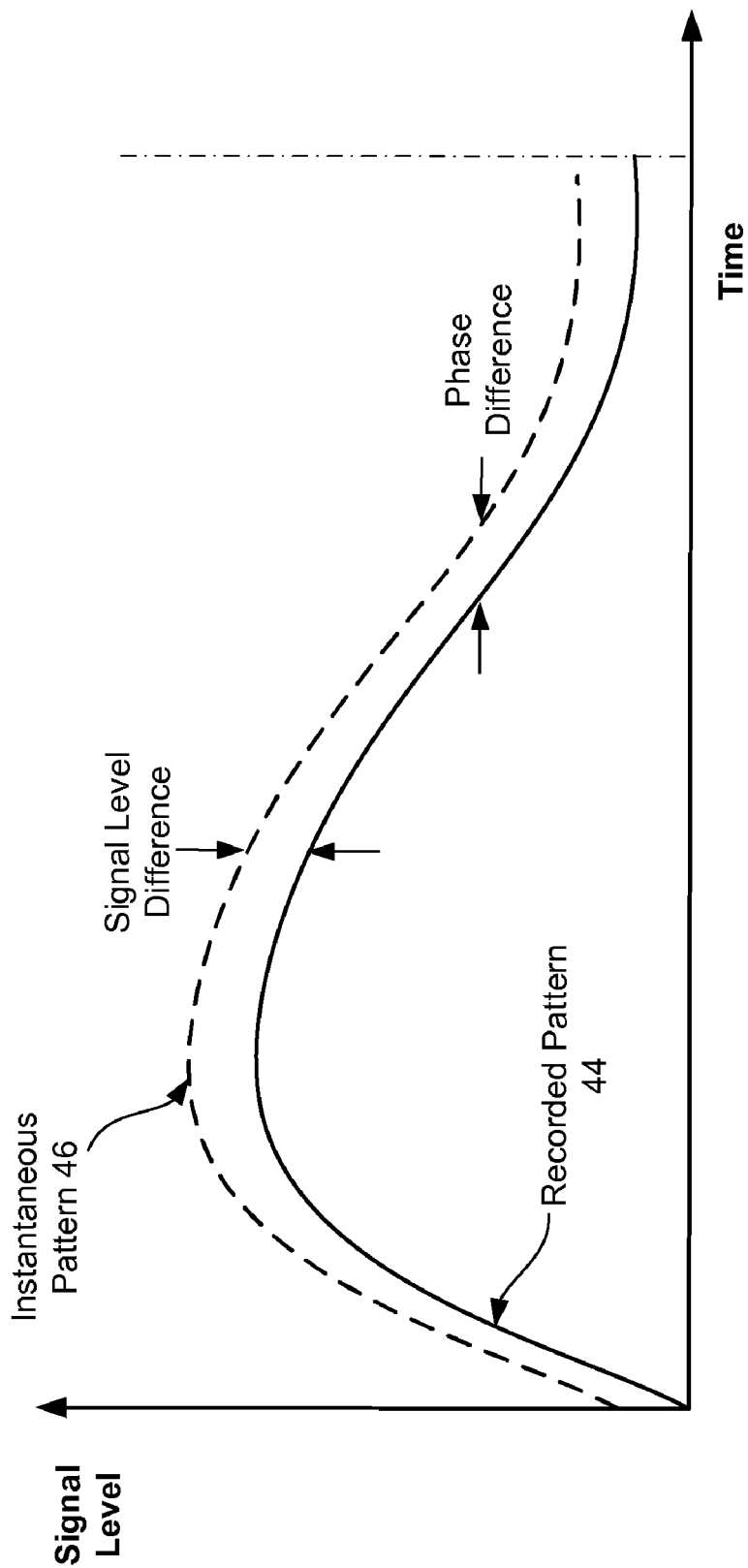
FIG. 7 is comparison between the recorded waveform and instantaneous waveform in which properties of signal drift in the integrated EAS/metal detection system is illustrated.

FIG. 7 illustrates a comparison of an exemplary recorded pattern 44 and instantaneous signal 46 (also referred to as "instantaneous pattern 46"). Recorded pattern 44 represents metal door EM field disturbances while instantaneous pattern 46 represents instantaneous field disturbances measured by a metal detection system utilizing the present invention. Instantaneous pattern 46 may be measured over time in which each measurement may correspond to a specific door position, e.g., instantaneous pattern 46 corresponds to a respective door cycle. Recorded pattern 44 may be a previously received instantaneous pattern 46 that may be updated as discussed in detail with respect to FIG. 8. In particular, FIG. 7 illustrates instantaneous pattern 46 having drift when compared to recorded pattern 44. The drift is indicated by the signal level difference between recorded pattern 44 and instantaneous pattern 46.

Drift may be caused by detection region changes, system 10 configuration changes and component aging, among other reasons. Detection region changes may include positional changes to door sensors 22, pedestals 12 and doors 20, among other component positional changes in system 10 that may cause instantaneous pattern 46 to drift from recorded pattern 44 when no metal object is present. Detection region changes may include the addition objects or components within or near the detection region such as to cause the drift. For example, the addition of a stationary advertisement having metal near the detection region may cause instantaneous pattern 46 to drift from recorded pattern 44. While not illustrated in FIG. 7, other pattern vitals or characteristics of recorded pattern 44 and instantaneous pattern 46 may be determined as discussed in detail with respect to FIG. 10.

Figure 8:
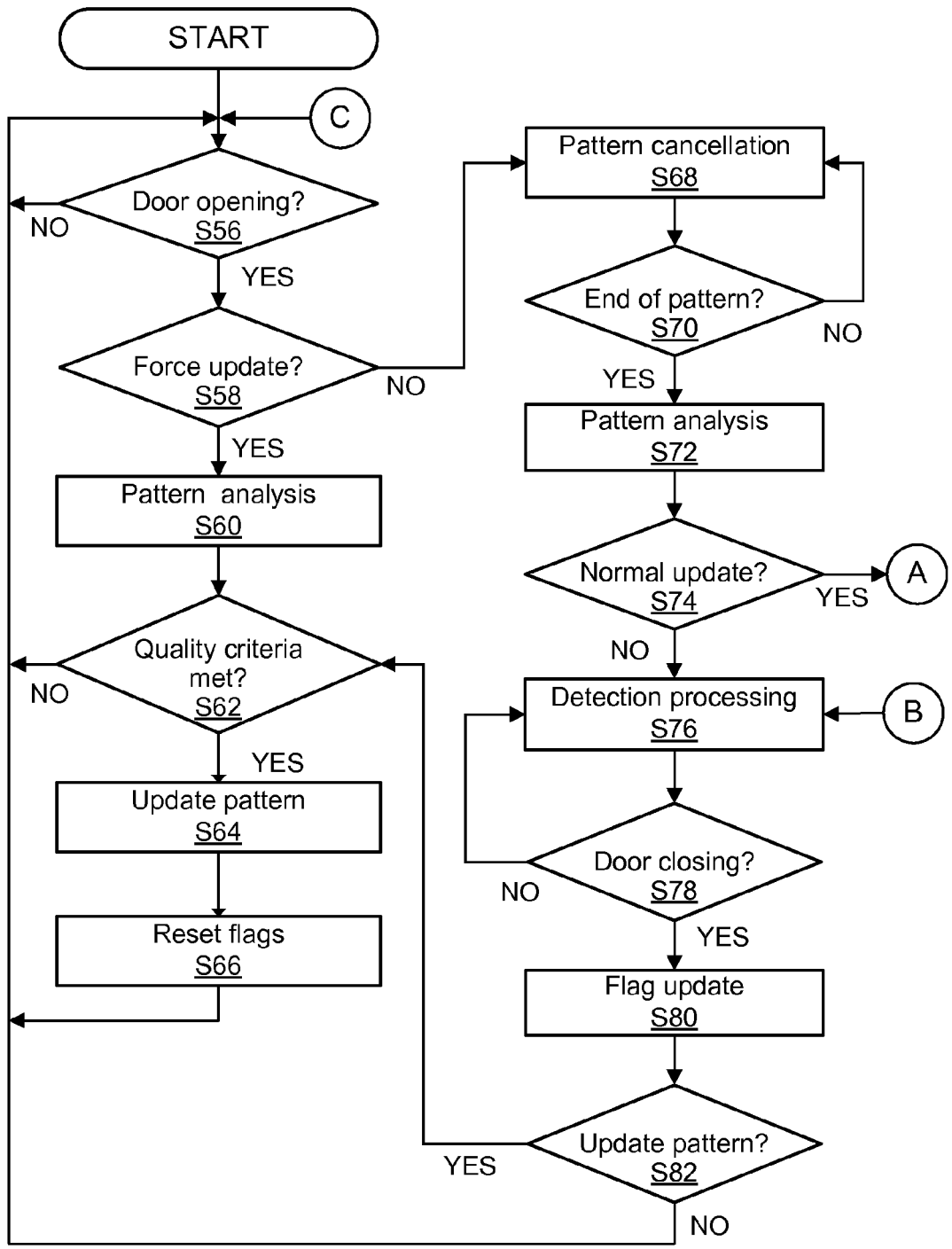
FIGS. 8 and 9 are a block diagrams illustrating an exemplary pattern update process of the present invention.
Figure 9:
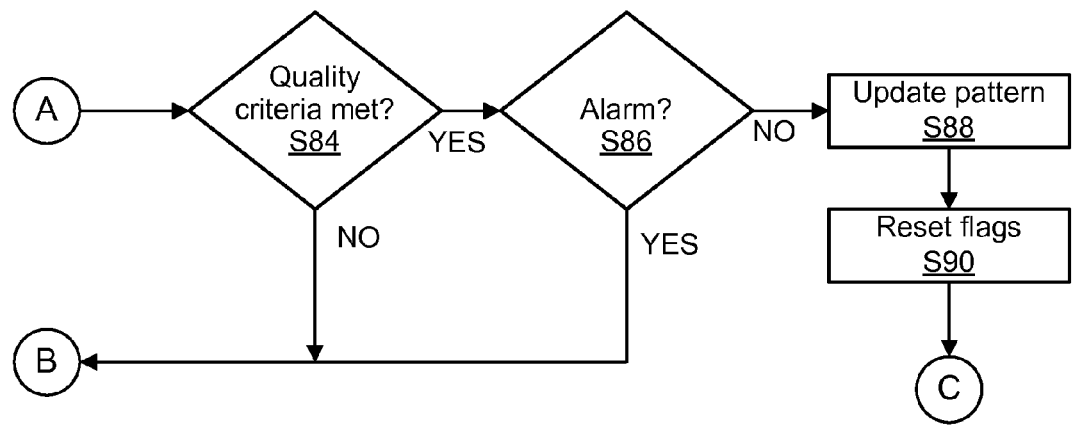

FIG. 8 is an exemplary flowchart of the process for updating recorded pattern 44 in accordance with the principles of the invention. A determination is made whether doors 20 are opening (Step S56). For example, sensors 22 may transmit positional information or data to system controller 16, metal detection module 18, pattern update module 64, among other modules, in which the positional data indicates the relative position of doors 20 when compared to a fully closed position of doors 20, i.e., positional data may indicate doors 20 are opening. If doors 20 are determined to be closed, Step S56 may be repeated. If doors 20 are determined to be opening, a determination is made whether a force update of recorded pattern 44 is needed (Step S58). Force update of recorded pattern 44 may occur when system controller 16 determines that at least one system attribute exceeds a flag threshold such that the flag is triggered, i.e., set, as discussed in detail with respect to the flag update process of FIG. 11.

The determination whether the force update of recorded pattern 44 is needed is based at least in part on a setting of a force flag. The force flag may be a character or series of characters stored in memory 30 that indicate whether to force an update of recorded pattern 44. For example, force flag having a value of "0" may indicate not to force the update of recorded pattern 44 while having a value of "1" may indicate to force the update of recorded pattern 44. The setting of force flag is discussed in detail with respect to the flag update process of FIG. 11. Pattern cancellation and/or detection processing may be inhibited upon the determination that a force update of recorded pattern 44 is needed, e.g., pattern cancellation may not be needed during a force update because recorded pattern 44 needs to be updated before detection processing is performed.

If pattern update module 64 determines that a force update of recorded pattern 44 is needed, a pattern analysis process may be performed (Step S60). The pattern analysis process may determine pattern vitals or characteristics that indicate pattern drift and the quality of instantaneous pattern 46, among other pattern characteristics. Pattern drift is the amount of drift of instantaneous pattern 46 when compared to recorded pattern 44. The pattern analysis process and pattern vitals are discussed in detail with respect to FIG. 10.

A determination is made as to whether at least one quality criterion is met (Step S62). The quality criteria correspond to a minimum level of quality in instantaneous pattern 46 to record that pattern for future use. For example, the quality criteria may define a maximum peak count value corresponding to a minimum acceptable pattern quality. Continuing the example, a maximum peak count value of eight (8) may indicate a minimum signal quality required of instantaneous pattern 46 in which an increasing number of peaks corresponds to lower pattern quality. Thus, in this example, exceeding eight peaks indicates the quality criterion has not been met. The quality criteria may indicate a minimum value corresponding to a minimum level of quality needed in instantaneous pattern 46. For example, the quality criteria may define a minimum signal level required of instantaneous pattern 46 such that falling below the minimum signal level indicates low pattern quality. The quality criteria are discussed in detail with respect to the pattern analysis process of FIG. 10.

If it is determined that the quality criteria are not met meaning the pattern does not meet the desired level of quality, the force update of recorded pattern 44 may not occur, i.e., the pattern update process may return to Step S56. In other words, while the force update of recorded pattern 44 is needed due to a triggered flag, e.g., flag set to "1," the force update may not update or replace recorded pattern 44 with a low quality instantaneous pattern 46, i.e., instantaneous pattern 46 does not meet the quality criteria. The process of Step S56 may be repeated such that the determination of Step S62 is repeated using another instantaneous pattern 46 received during a new door cycle, i.e., during another opening of doors 20 or another door cycle.

If the at least one quality criterion is determined to be met, recorded pattern 44 may be updated or replaced with instantaneous pattern 46 (Step S64). Instantaneous pattern 46 having a pattern quality that meets the quality criteria replaces recorded pattern 44 in memory 30. Recorded pattern 44 may be updated irrespective of whether alarm 34 has been activated. For example, force update of recorded pattern 44 may be needed because the amount of pattern drift is causing false alarms such that alarm 34 is not considered during a force update. The force update of recorded pattern 44 causes instantaneous pattern 46 to become the new baseline for performing the metal detection process of FIGS. 4-5, i.e., instantaneous pattern 46 will replace recorded pattern 44. After updating recorded pattern 44, one or more flags may be reset (Step S66). For example, force flag may be rest to "0" in order to indicate that no force update is currently required. The flags discussed in detail with respect to Step S74 may also be reset, i.e., reset to "0." After resetting one or more flags, the pattern update process may move to Step S56.

Returning to Step S58, if it is determined that a force update is not needed, e.g., force update flag is not triggered, pattern cancellation may be performed (Step S68). For example, pattern cancellation may be performed using recorded pattern 44 and instantaneous pattern 46 as illustrated and discussed above with respect to FIGS. 4-5. If it is determined that the end of pattern has not been reached, pattern cancellation may continue to be performed, e.g., repeat Step S68. The end of pattern indicates that the end of recorded pattern 44 and/or instantaneous pattern 46 has been reached such that doors 20 have reached an open position (Step S70). For example, end of pattern may be reached after doors 20 transition from a closed position to a fully open position such that doors 20 are no longer opening and are not closing. If the end of pattern has been reached, pattern analysis may be performed (Step S72). The pattern analysis process of Step S72 is the same as in Step S60, discussed in detail with respect to FIG. 10.

After pattern analysis is performed, a determination is made as to whether a normal update of recorded pattern 44 is needed (Step S74). The normal update of recorded pattern 44 may indicate that recorded pattern 44 needs to be updated but not as urgently as during a force update, as discussed in detail with respect to FIG. 11. The normal update of recorded pattern 44 may be determined to be needed based at least in part on a triggered normal flag. The normal flag may be a character or series of characters stored in memory 30 that indicate whether the normal update of recorded pattern 44 is needed. For example, normal update flag having a value of "0" may indicate not to perform the normal update on recorded pattern 44, while having a value of "1" may indicate to perform the normal update recorded pattern 44. The setting of normal update flag is discussed in detail with respect to the flag update process of FIG. 11.

If it is determined that the normal update of recorded pattern 44 is not required, e.g., normal flag is not triggered, detection processing may be performed (Step S76). Detection processing is performed in order to determine whether a metal object has been detected within the interrogation zone, e.g., the metal object is detected without interference from signal disturbances caused by the movement of the metals doors due to pattern cancellation at Step S68. A determination is made whether doors 20 are closing (Step S78). The determination whether doors 20 are closing may be based at least in part on positional data from sensors 22. If doors 20 are determined not to be closing, the detection process of Step S76 may be repeated or continued. However, if doors 20 are determined to be closing, detection processing may be inhibited or stopped, i.e., detection processing may not be needed while doors are closing because it is unlikely a metal object is present in the interrogation zone during the door closure process. Inhibiting detection processing during doors 20 closing or while doors 20 are closed saves processing resources. If doors 20 are determined to be closing, the flag update may be performed as discussed in detail with respect to FIG. 11

(Step S80). The flag update may be performed in order to determine whether the normal and/or force flags needed to be set to "1," i.e., triggered.

A determination is made whether to update recorded pattern 44 with instantaneous pattern 46 (Step S82). The determination of Step S82 may be based at least in part on whether the flag update of Step S80 triggered any flags. If a normal flag and/or force flag are triggered or set to "1" at Step S80, recorded pattern 44 may be updated using instantaneous pattern 46 of the current door cycle. Whether to update recorded pattern 44 based on the current door cycle or a future door cycle is based at least in part on the pattern vitals, system attributes and/or system design. If it is determined not to update recorded pattern 44, Step S56 may be repeated. However, if it is determined that recorded pattern 44 needs to be updated, the quality criteria determination of Step S62 may be performed as discussed above with respect to Step S62. Alternatively, the quality criteria determination of Step S62 may be skipped such that Step S82 transitions directly to updating recorded pattern 44 at Step S66. Alternatively, if it is determined to update recorded pattern 44, the determination of Step S56 may be made such that recorded pattern 44 will be updated with another instantaneous pattern 46 received during a subsequent door cycle.

Returning to Step S74, if it is determined that the normal update of recorded pattern 44 is required, e.g., normal update flag is triggered, a determination is made whether the quality criteria is met, i.e., whether instantaneous pattern 46 has a minimum pattern quality (Marker "A" to Step S84). For example, the determination of Step S84 may be the same or substantially similar to the determination of Step S62. If the quality criteria are determined not to be met, the detection processing of Step S76 may be performed (Marker "B" to Step S76). However, if the quality criteria are determined to be met, a determination is made whether alarm 34 has been activated (Step S86). For example, a determination is made whether instantaneous pattern 46 has activated alarm 34. If alarm 34 is determined to have been activated, the detection processing of Step S76 may be performed (Marker "B" to Step S76). If alarm 34 is determined not to have been activated such that no metal objects are present in the interrogation zone, recorded pattern 44 may be updated or replaced with instantaneous pattern 46 (Step S88). The update pattern Steps of S64 and S88 may be the same or substantially the same. After updating recorded pattern 44, the force and/or normal update flags may be reset or set to "0." The reset flags Steps of S66 and S90 may be the same or substantially the same. After the flags have been reset, the determination of Step S56 may be performed, i.e., the door opening determination may be performed (Marker "C" to Step S56).

Figure 10:
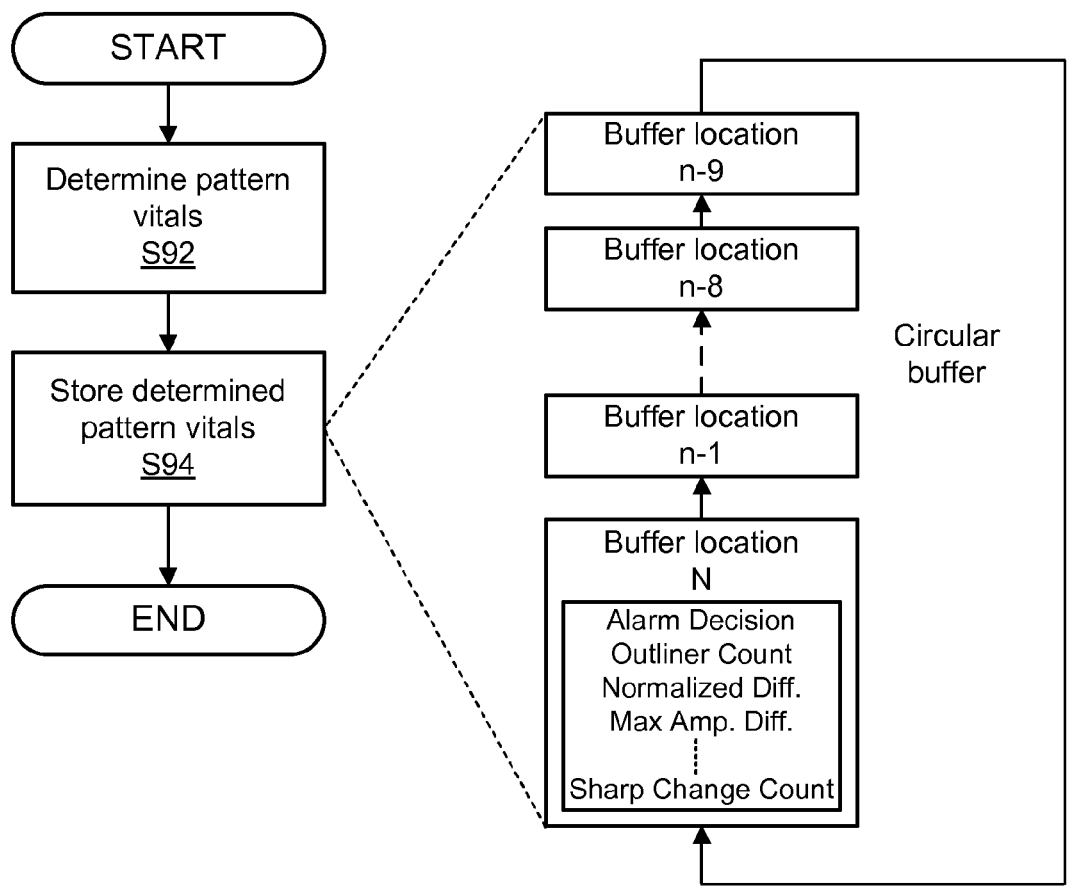
FIG. 10 is a block diagram illustrating an exemplary pattern analysis process of the present invention.

FIG. 10 is a flowchart of an exemplary pattern analysis process of Steps S60 and S72 in accordance with the principles of the invention. One or more pattern vitals or characteristics are determined (Step S92). Pattern vitals may indicate the quality and pattern drift of the instantaneous pattern 46, among other characteristics of instantaneous pattern 46 and/or recorded pattern 44. The pattern drift in pattern vitals indicates the amount of drift between instantaneous pattern 46 and recorded pattern 44. For example, pattern drift may include alarm activation, outlier count, normalized sum, maximum amplitude difference, minimum amplitude difference, maximum phase difference and minimum phase difference, among other characteristics of instantaneous pattern 46, recorded pattern 44 and/or the comparison of the two patterns.

The alarm decision may indicate whether instantaneous pattern 46 activated alarm 32. The outliner count may indicate the number of impulses in instantaneous pattern 46. For example, the outlier count may include the number of signal level spikes in instantaneous pattern 46 that exceed a predefined signal level value. The normalized sum of instantaneous pattern 46 may format the sum of instantaneous pattern 46 values such that they may be compared with previously stored normalized sums of instantaneous pattern 46, i.e., each instantaneous pattern 46 is normalized between a predefined minimum value and maximum value.

The maximum amplitude difference may correspond to the maximum amplitude difference between recorded pattern 44 and instantaneous pattern 46. The minimum amplitude difference may correspond to the minimum amplitude difference between recorded pattern 44 and instantaneous pattern 46. The maximum phase difference may correspond to the maximum phase difference between recorded pattern 44 and instantaneous pattern 46. The minimum phase difference may correspond to the minimum phase difference between recorded pattern 44 and instantaneous pattern 46.

The quality of instantaneous pattern 46 may include a peak count and sharp change count, among other characteristics of instantaneous pattern 46. The peak count may be the number of amplitude peaks in instantaneous pattern 46. For example, each peak count may indicate a change in amplitude from a lower value to a higher value back to a value below the higher value. While not a typical peak count and for illustration purposes only, FIG. 7 illustrates received instantaneous pattern 46 having a peak count of one. The peak count may indicate at least in part the pattern quality of instantaneous pattern 46, e.g., the lower peak count, the higher the quality of instantaneous pattern 46.

The sharp change count may indicate a minimum amplitude change over a predefined period of time. For example, the sharp change count may be a minimum amplitude change over N samples of instantaneous pattern 46 where N is a positive integer. The sharp change count may indicate at least in part the pattern quality of received instantaneous pattern 46, e.g., the higher the sharp change count, the lower the quality of instantaneous pattern 46.

The determined pattern vitals may be stored in memory 30 (Step S94). The determined pattern characteristics of received instantaneous pattern 46 may be stored at a location in an N-location circular buffer wherein N is a positive integer. Each location in the circular buffer may store the determined pattern characteristics of instantaneous pattern 46 received during a respective door cycle. The circular buffer may be a fixed-sized (N-sized) buffer in which data, e.g., determined pattern vitals, are written to the buffer such that the data that has been written in the buffer the longest is the first to be written over by new data. The oldest data in N-location circular buffer stored at location n is the first to be overwritten by new data. The initial size of circular buffer may be set based at least in part on measurements at the site of system deployment, e.g., based on measurements during system setup. The size of circular buffer, e.g., N-locations, may be static or dynamically updated based on system performance. Less stable systems such as those with more drift may have a greater N value than more stable systems having less drift, $N_{large} > N_{small}$. The size of circular buffer may be varied based on system performance. Alternatively, the size of circular buffer may only be updated by a system operator, i.e., remains static until manually updated by the system operator. N-location circular buffer allows system 10 to continuously track performance and drift without consuming valuable system resources.

Figure 11:
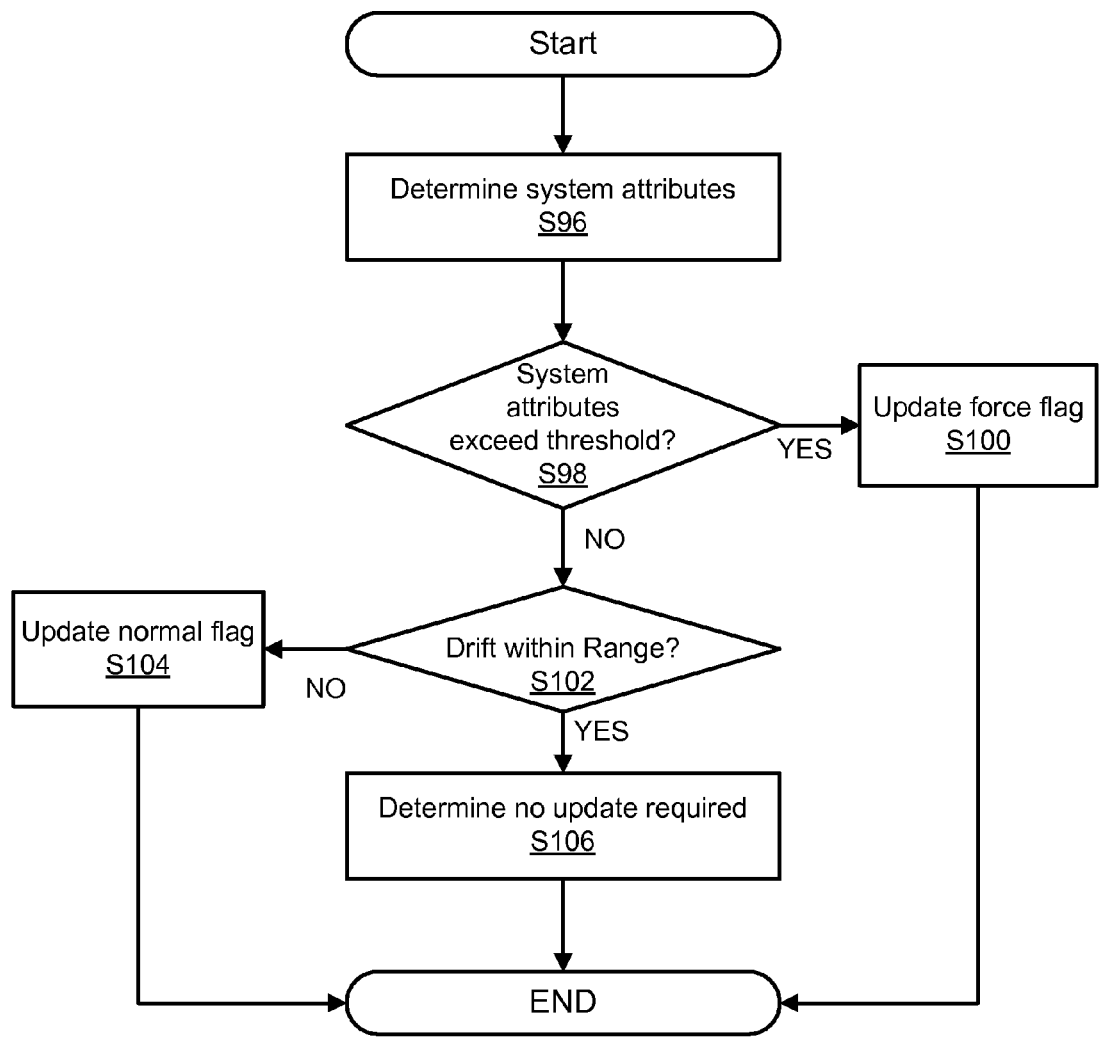
FIG. 11 is a block diagram illustrating an exemplary flag update process of the present invention.

FIG. 11 is a flowchart of an exemplary flag update process in accordance with the principles of the invention. System attributes are determined, e.g., at least one system attribute is determined (Step S96). The system attributes may indicate the amount of pattern drift over a predefined amount of door cycles and the total alarm count. System attributes may include total alarm count, average difference, difference deviation and outliner deviation, among other statistics based at least in part on data stored in N-location circular buffer, i.e., system attributes are determined based at least in part on pattern vitals stored in N-location circular buffer. The total alarm count may be the summation of the alarm activations for each location in the circular buffer. For example, only buffer locations n-1 and n-8 may have alarm decisions indicating the activation of alarm 34 such that the total alarm count is two. The average difference includes the average difference between one or more pattern vitals stored in the N-location circular buffer. For example, the average difference may include average maximum amplitude difference, minimum amplitude difference, maximum phase difference and minimum phase difference, among other average differences one or more pattern vitals. The average difference between maximum phase difference among pattern vitals stored in circular buffer locations n to n-9 may be determined.

The difference deviation may include the deviation between one or more pattern vitals stored in N-location circular buffer. The difference deviation may be a standard deviation among the outlier count, normalized sum, maximum amplitude difference, minimum amplitude difference, maximum phase difference and/or minimum phase difference, respectively. For example, the standard deviation among the maximum amplitude difference, stored in circular buffer locations n to n-9, may be determined. Standard deviations of other determined pattern vitals may be determined.

A determination is made as to whether at least one system attribute exceeds at least one flag threshold (Step S98). The flag threshold may be a predefined value or quality level such that exceeding the flag threshold indicates that recorded pattern 44 has to be updated. For example, the flag threshold for total alarms may be five (5) such that when the determined total alarms of system attributes exceeds five, recorded pattern 44 is updated, i.e., a force update flag is triggered. Other flag thresholds or combination of flag thresholds based on system attribute values may be used to determine whether the force update of recorded pattern 44 is needed. For example, system controller 16 may determine recorded pattern 44 has to be updated, i.e., triggers a force flag, in response to determining both the average difference and outlier deviation in system attributes exceed respective flag thresholds. In response to determining that at least one system attribute exceeds at least one flag threshold, the force update flag may be set or triggered, e.g., the force update flag may be set to "1" (Step S100). For example, the at least one flag threshold may be a total alarm count of five such that when total alarm count exceeds five, a force update flag is triggered. The force update flag may be triggered irrespective of the pattern drift indicated in system attributes, i.e., is based on total number of triggered alarms 34.

If the determination is made that at least one system attribute does not exceed at least one flag threshold, a determination is made as to whether the at least one system attribute is within a drift range (Step S102). The drift range may be a predefined range of one or more system attributes values that indicate system 10 has no or some pattern drift but not enough to cause the at least one system attribute to exceed the at least one flag threshold in Step S98. If the determination is made that at least one system attribute is not within the drift range, the normal update flag may be triggered, i.e., the normal update flag is updated (Step S104). The amount of pattern drift over a predefined amount of door cycles may be outside the drift range. For example, the average difference in the system attributes is outside the predefined drift range. The drift range may provide early detection of growing drift such that only normal updates are required to maintain accurate metal detection, i.e., a force update is not required.

If the determination is made that at least one system attribute is within the predefined drift range, a determination is made not to update any flags, e.g., normal flag and force update flag remain at null values or "0" because the current drift is not significant enough to trigger a normal and/or force update flag (Step S106).

The present invention can be realized in hardware, software, or a combination of hardware and software. Any kind of computing system, or other apparatus adapted for carrying out the methods described herein, is suited to perform the functions described herein.

A typical combination of hardware and software could be a specialized or general purpose computer system having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

In addition, unless mention was made above to the contrary, it should be noted that all of the accompanying drawings are not to scale. Significantly, this invention can be embodied in other specific forms without departing from the spirit or essential attributes thereof, and accordingly, reference should be had to the following claims, rather than to the foregoing specification, as indicating the scope of the invention.

What is claimed is:

1. An electronic article surveillance (EAS)/metal detection device, the device comprising:
    a receiver, the receiver receiving a signal pattern representing electromagnetic field disturbances over time caused by movement of metal doors in a detection region, the signal pattern being usable to reduce interference effects of the movement of the metal doors in an electronic article surveillance (EAS)/metal detection system;
    a memory, the memory in communication with the receiver, the memory storing a recorded signal pattern of a previously received signal pattern and at least one quality criterion; and
    a processor, the processor in communication with the memory, the processor:
        determining pattern vitals, the pattern vitals indicating a quality of the received signal pattern;
        determining whether the at least one quality criterion is met based at least in part on the pattern vitals; and
        updating the recorded signal pattern based at least in part on determining that the at least one quality criteria is met.

2. The EAS/metal detection device of claim 1, wherein the received signal pattern corresponds to the movement of the metal doors from a closed position to an open position.

3. The EAS/metal detection device of claim 1, wherein the pattern vitals include at least one of a number of signal peaks and number of sharp signal changes, the sharp signal change being a minimum rate of signal change over time.

4. The EAS/metal detection device of claim 1, wherein the processor further determines system attributes, the system attributes indicating at least one of signal drift of a plurality of previously received signal patterns and a number of alarms triggered by the plurality of previously received signal patterns.

5. The EAS/metal detection device of claim 4, wherein updating the recorded signal pattern occurs based at least in part on whether the number of alarms triggered exceed a threshold.

6. The EAS/metal detection device of claim 5, wherein updating the recorded signal pattern occurs irrespective of the signal drift of a plurality of previously received signal patterns when the threshold is exceeded.

7. The EAS/metal detection device of claim 6, wherein updating the recorded signal pattern occurs based at least in part on the signal drift of the plurality of previously received signal patterns when the threshold is not exceeded.

8. The EAS/metal detection device of claim 4, wherein the memory further includes a N-location circular buffer where N is a positive integer, the circular buffer storing pattern vitals of the plurality of previously received signal patterns, each of the plurality of previously received signal patterns corresponding to a different occurrence of the metal doors opening, the system attributes are based at least in part on the pattern vitals stored in the circular buffer.

9. An integrated electronic article surveillance (EAS)/metal detection system, the system comprising:
  at least one sensor, the at least one sensor detecting a position of metals doors in a detection region; and
  a device, the device comprising:
    a receiver, the receiver in communication with the at least one sensor, the receiver receiving positional data of metal doors and a signal pattern representing electromagnetic field disturbances over time caused by movement of the metal doors in the detection region, the signal pattern being usable to reduce interference effects of the movement of the metal doors in the electronic article surveillance (EAS)/metal detection system;
    a memory, the memory in communication with the receiver, the memory storing a recorded signal pattern of a previously received signal pattern and at least one quality criterion; and
    a processor, the processor in communication with the memory, the processor:
      determining whether the metal doors are opening based at least in part on the positional data;
      determining pattern vitals in response to determining the metal doors are opening, the pattern vitals indicating a quality of the received signal pattern;
      determining whether the at least one quality criteria is met based at least in part on the pattern vitals; and
      updating the recorded signal pattern in response to determining the quality criteria is met.

10. The system of claim 9, wherein the received signal pattern corresponds to the movement of the metal doors from a closed position to an open position.

11. The system of claim 9, wherein the processor further determines system attributes, the system attributes indicating at least one of signal drift of a plurality of previously received signal patterns and a number of alarms triggered by the plurality of previously received signal patterns.

12. The system of claim 11, wherein updating the recorded signal pattern occurs based at least in part on whether the number of alarms triggered exceed a threshold.

13. The system of claim 12, wherein updating the recorded signal pattern occurs based at least in part on the signal drift of the plurality of previously received signal patterns when the threshold is not exceeded.

14. The system of claim 13, wherein updating the recorded signal pattern occurs irrespective of the signal drift of the plurality of previously received signal patterns when the threshold is exceeded.

15. The system of claim 9, wherein the memory further includes a N-location circular buffer where N is a positive integer, the circular buffer storing pattern vitals of the plurality of previously received signal patterns, each of the plurality of previously received signal patterns corresponding to a different occurrence of the metal doors opening, the system attributes are based at least in part on the pattern vitals stored in the circular buffer.

16. A method of reducing signal interference effects of metal doors in a metal detection system, the method comprising:
  receiving a signal pattern representing electromagnetic field disturbances over time caused by movement of metal doors in a detection region, the signal pattern being usable to reduce interference effects of the movement of the metal doors in the metal detection system;
  storing a recorded signal pattern of a previously received signal pattern and at least one quality criterion;
  determining pattern vitals, the pattern vitals indicating a quality of the received signal pattern;
  determining whether the at least one quality criteria is met based at least in part on the pattern vitals; and
  updating the recorded signal pattern in response to determining the at least one quality criteria is met.

17. The method of claim 16, wherein the processor further determines system attributes, the system attributes indicating at least one of signal drift of the plurality of previously received signal pattern and a number of alarms triggered by the plurality of previously received signal patterns.

18. The method of claim 17, wherein updating the recorded signal pattern occurs based at least in part on whether the number of alarms triggered exceed a threshold.

19. The method of claim 18, wherein updating the recorded signal pattern occurs based at least in part on the signal drift of the plurality of previously received signal patterns when the threshold is not exceeded.

20. The method of claim 17, further including storing pattern vitals of the plurality of previously received signal patterns in a N-location circular buffer where N is a positive integer, each of the plurality of previously received signal patterns corresponding to a different occurrence of the metal doors opening, the system attributes are based at least in part on the pattern vitals in the circular buffer.

* * * * *